United States Patent
Prehofer

(10) Patent No.: US 7,239,631 B1
(45) Date of Patent: Jul. 3, 2007

(54) METHOD FOR RE-ROUTING DATA PACKETS ONTO AN ALTERNATIVE NETWORK

(75) Inventor: Christian Prehofer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/744,829

(22) PCT Filed: Jul. 1, 1999

(86) PCT No.: PCT/DE99/02016

§ 371 (c)(1),
(2), (4) Date: Apr. 3, 2001

(87) PCT Pub. No.: WO00/08798

PCT Pub. Date: Feb. 17, 2000

(30) Foreign Application Priority Data

Aug. 3, 1998 (DE) .................. 198 34 977

(51) Int. Cl.
H04L 12/28 (2006.01)
H04L 12/56 (2006.01)
H04L 12/66 (2006.01)

(52) U.S. Cl. .................. 370/389; 370/352; 370/392

(58) Field of Classification Search ........ 370/351–356, 370/493, 389
See application file for complete search history.

(56) References Cited

U.S. PATENT DOCUMENTS

| 5,732,078 | A | 3/1998 | Arango | |
|---|---|---|---|---|
| 6,307,853 | B1* | 10/2001 | Storch et al. | 370/354 |
| 6,463,053 | B1* | 10/2002 | Chen | 370/352 |
| 6,466,548 | B1* | 10/2002 | Fitzgerald | 370/249 |
| 6,490,252 | B1* | 12/2002 | Riggan et al. | 370/237 |
| 6,574,216 | B1* | 6/2003 | Farris et al. | 370/352 |
| 6,697,333 | B1* | 2/2004 | Bawa et al. | 370/238 |

OTHER PUBLICATIONS

Almesberger, et al. "Application Requested IP Over ATM (Arequipa) and Its Use In the Web"; Global Information Infrastructure (GII) Evolution; IOS Press, 1996; pp. 252-260.
Gung-Chou, et al.; "Support Qos in IP Over ATM"; National Taiwan University of Science and Technology. Taipei. Taiwan; Jun. 1997.
Nichols, et al.; "Differentiated Service Operational Model and Definitions"; Internet engineering Task Force; Feb. 1998.
Bernet, et al.; "A Framework for End-to-End Qos Combining RSVP/Intserv and Differentiated Service"; Internet Engineering Task Force; Mar. 1998.

* cited by examiner

*Primary Examiner*—Chirag G. Shah

(57) ABSTRACT

Data packets of a packet-switching network for which transmission of a requested quality is to be assured, are routed via an alternate network. In a source node, such data packets are respectively identified by a bit pattern known to an access node, which is connected to the source node, either directly or indirectly, via at least one intermediate node. The bit pattern is recognized upon arrival in the access node, and as a result of identifying the data packets with the known bit pattern, the data packets are re-routed onto the alternate network.

12 Claims, 1 Drawing Sheet

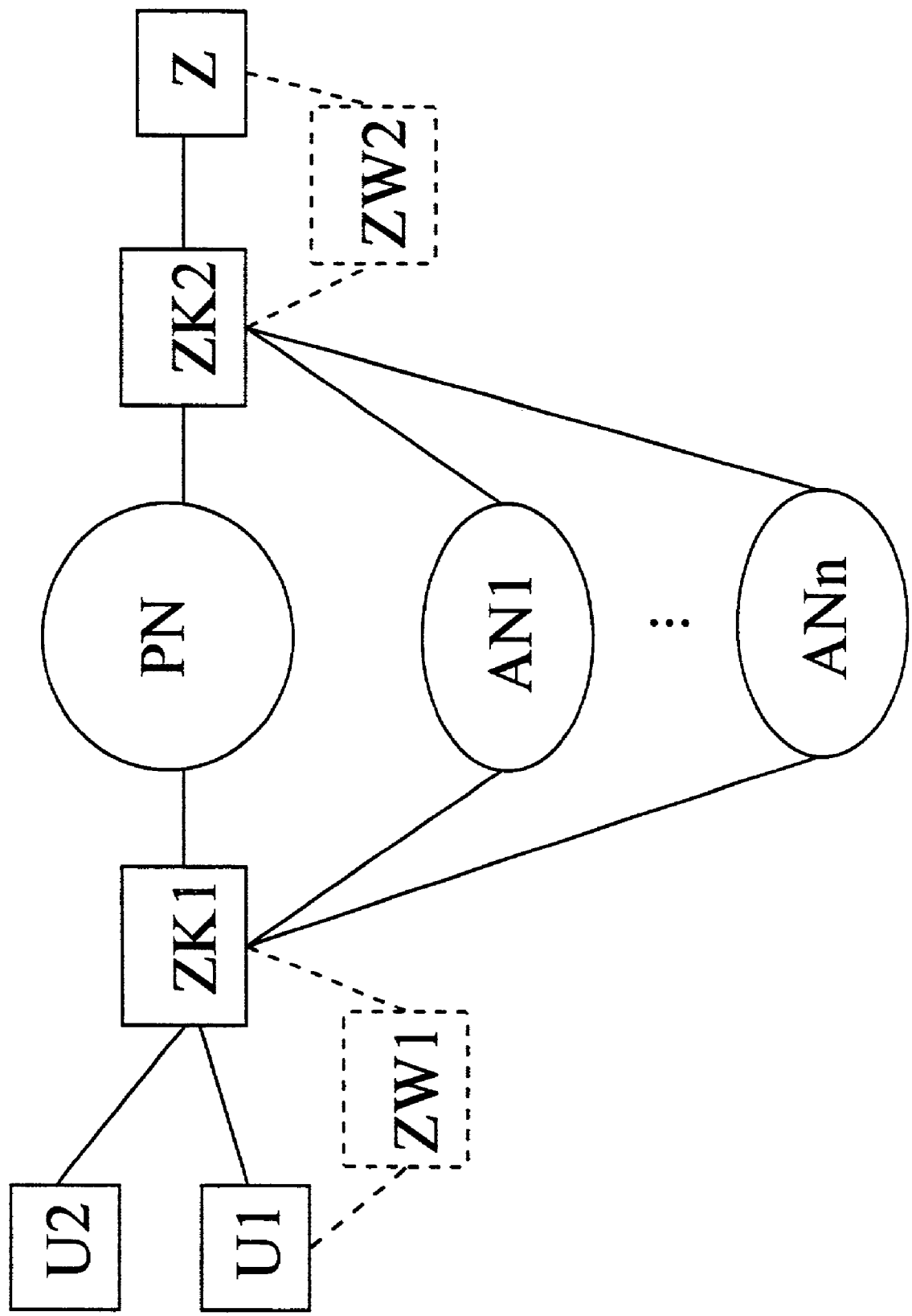

METHOD FOR RE-ROUTING DATA PACKETS ONTO AN ALTERNATIVE NETWORK

BACKGROUND OF THE INVENTION

1. Field of the Invention

The present invention is generally directed to telecommunication networks. In particular, the present invention is directed to methods for re-routing data packets on a data switching network.

2. Discussion of the Related Art

In a packet-switching network, such as for example the Internet, which is usually composed of a plurality of sub-networks, data packets from a source node are potentially transmitted to a destination node via a plurality of intermediate and/or access nodes of the individual sub-networks. In addition to containing information, the data packets particularly contain a destination address. The intermediate and/or access nodes contain what is referred to as a routing table for determining a traffic path in which each destination address of a data packet has a destination address of that node such as an intermediate node or an access node, to which the data packet is forwarded allocated to it. Thus, when a data packet arrives at such a node, the data packet is forwarded to the node corresponding to its destination address entry in the routing table.

The data transmission in such a packet-switching network is normally connectionless, i.e. the data packets with identical source and destination address are transported independently of one another, so that neither the sequence nor a delivery of the data packets at the destination node is guaranteed, such as under OSI Layer 3 Protocol. However, a quality of the transmission of data packets between source and destination node such as certain bandwidth, delay times and a specific throughput, can not be promised.

Video transmission services, such as video on demand and various telephone services, such as voice over IP in the Internet, require a dependable and fast data transmission with an assured quality.

An "Internet Draft" document authored by K. Nichols and S. Blake that was published by the Internet Engineering Task Force in February 1998 (Internet site: http://www.ietf.org/internet-drafts/draft-nichols-dsopdef-00.txt) proposes a method that enables an accelerated transmission of data packets from a source node to a destination node.

For data packets to be forwarded especially fast, specific bits of what is referred to as the TOS (type of service) byte in the header part of such a data packet are set. Such data packets can be divided into various classes on the basis of the bits that are set in the TOS byte. According to their class, the data packets identified with the set bits are given privileged handling in the intermediate nodes via which such data packets are transmitted from the source node to the destination node, as a result an accelerated forwarding to the next node, intermediate or destination node is achieved.

A critical disadvantage of this method is that the privileged handling in the forwarding of the data packets identified with the set bits leads to considerable delays in the forwarding of the data packets to be transmitted normally. Moreover, it is not only the destination addresses but also the respective TOS bytes that must be taken into consideration in every intermediate node when forwarding the data packets.

Another "Internet Draft" document authored by Y. Bernet, R. Yavatkar, P. Ford, F. Baker and L. Zhang that was published by the Internet Engineering Task Force in March 1998 (Internet site: http://ietf.org/internet-drafts/draft-bernet-intdiff-00.txt) presents a method that, with the assistance of the above-explained method, combines a plurality of demands made of the Internet for a guaranteed quality for the transmission of data packets into classes. A corresponding quality for the transmission of data packets is assured according to such a class.

Since a required quality for the transmission of data packets with a privileged handling thereof on the basis of the aforementioned, set bits in the TOS byte is assured, this method can be reduced to the initially explained approach. However, this method too suffers from the disadvantages mentioned above.

Another approach to offering the user of a video transmission service of a bandwidth suitable for the transmission of data packets is disclosed by U.S. Pat. No. 5,732,078.

That patent discloses an arrangement of an access node to the Internet that assures a bandwidth requested by the user for the transmission of data packets by re-routing data packets onto an alternate network. The re-routing of the data packets requires a user to request a specific bandwidth for the transmission of data packets from his user terminal device to a destination node. Then, the access node to which the user terminal device is connected sets up a point-to-point connection to the access node to which the destination node is connected via the alternate network offering the requested bandwidth.

To re-route the data packets for whose transmission the user requests an assured bandwidth onto the alternate network, an existing routing table in the access node to which the user terminal device is connected is finally modified such that, in addition to containing the respective destination addresses of the nodes to which data packets are respectively forwarded, it also contains the source addresses of the data packets to be re-routed due to a quality requested by the user. According to a modification of the method presented in the U.S. Pat. No. 5,732,078 mentioned above, a connection-individual or a transmission-individual particular, also know as an application port number, is entered into the routing table.

On the basis of the additionally stored source address and the connection-Individual or transmission-individual particular in the routing table, the data packets arriving at such an access node can be selected according to whether they are routed over the ordinary Internet or via the alternate network.

This method is very involved since a separate connection via the alternate network must be set up for every transmission of data packets with a requested bandwidth that is initiated by a user.

Additionally, the routing table must be modified in every access node to which user terminal devices are connected, namely after every transmission of data packets with a specific bandwidth initiated by a user.

Also to be considered is that all data packets arriving at such an access node are examined for their source address in order for the connection-individual or transmission-individual particular, with reference to the source address, to be re-routing onto the alternate network.

In their Master Thesis, "Support Qos in IP over ATM", June 1997 (1997–06), National Taiwan University of Science and Technology, Taipei, Taiwan, (available online), Gung-Chou Lai and Ruay-Shiung Chang state that it is possible in a switching system to use the field TOS (Type of Service) in the header part of data packets which are to be switched or transmitted to determine whether an existing Virtual Channel is used or a new Virtual Channel has to be initiated.

SUMMARY OF THE INVENTION therefore, it is an object of the present invention to provide a method for switching data packets of a specific quality in a packet switching network onto an alternate network.

It is another object of the present invention to provide a method for switching data packets of a specific quality in a packet switching network onto an alternate network, wherein a routing table remains unaffected by ongoing modifications for the re-routing of the data packets.

It is a further object of the present invention to provide a method for switching data packets of a specific quality in a packet switching network onto an alternate network, wherein data packets need only be examined for a known bit pattern in the access node connected to a source node.

It is an additional object of the invention to provide a method for switching data packets of a specific quality in a packet switching network onto an alternate network, wherein data packets arriving in an access node directly or indirectly connected to a source node proceeding from the source node are checked with a filter for a bit pattern known to the access node.

It is yet another object of the invention to provide a method for switching data packets of a specific quality in a packet switching network onto an alternate network, wherein the data packets are identified in their source node by a bit pattern known to the access node connected to the source node either directly or indirectly via at least one intermediate node.

BRIEF DESCRIPTION OF THE DRAWINGS

FIG. 1 shows a data switching network according to the present invention.

DETAILED DESCRIPTION OF THE PREFERRED EMBODIMENTS

Accord to FIG. 1, two source nodes U1, U2 of a plurality of conceivable source nodes and one of many possible destination nodes Z. The two source nodes U1, U2 are connected to an access node ZK1 and the destination node Z is connected to an access node ZK2, either directly or indirectly via respectively one or more intermediate nodes ZW1, ZW2. The intermediate node ZW1 is shown with broken lines between U1 and ZK1, and the intermediate node ZW2 is shown with broken lines between ZK2 and Z. The access nodes ZK1 and ZK2 belong to a packet-switching network PN and respectively form an access to one or more alternate networks AN1 through ANn at the same time. Such a packet-switching network could be the Internet for example, within which mainly variable-length data packets are transmitted. Or, such a packet switching network could also be an ATM network (asynchronous transfer mode), wherein fixed-length data packets (ATM cells) are usually transported. Given the pre-condition that such an alternative network assures a requested quality for the data transmission, the alternative network can be formed by an arbitrary network type, for example a line-switching network, a packet-switching network or an ATM network. Such an alternate network can also be composed of at least one logical channel of the packet-switching network PN.

Normally, data packets are sent by an access node, for example ZK1, to the packet-switching network PN from the source node either directly (for example, proceeding from U2) or indirectly (for example, proceeding from U1), via one or more intermediate nodes, for example ZW1. From the access node, they are sent via the packet-switching network to another access node, for example ZK2, and are sent from the latter to a destination node Z either directly or via one or more intermediate nodes, for example ZW2. A transmission of data packets in the opposite direction is likewise conceivable, i.e. with the destination node as source node and with the source node as destination noodle.

In view of an overall telecommunication network, the indicated source node and the destination node can be respectively interpreted as intermediate node or end node of the telecommunication network. Such end nodes can thereby be viewed as a computer of a service vendor or as a data terminal device of a user.

In the present example, a user who would like to have his data terminal device, for example U1, receive an Internet service, for example video on demand, from a computer, for example Z, of a service vendor. For the transmission of data packets of such a service, a certain quality in the form of a specific bandwidth must be assured at the network side. The bandwidth needed for the service can be offered be re-routing the data packets belonging to such a service onto an alternate network that assures the requested quality.

Accordingly, the source node, for example U1, sends a message to the access node ZK1 either directly or indirectly via at least one intermediate node, for example ZW1, this message containing a request in the form of re-routing data packets for whose transmission a specific quality, for example bandwidth, is required. In the form of a message, the access node communicates the bit pattern with which the data packets to be routed onto the alternate network are identified to the source node U1 and additionally acknowledges the message with the request sent from the source node U1. Further, the access node sends a message about the quality requested by the source node to the network node (not shown in FIG. 1) of an alternate network, for example AN1, and potentially waits for the acknowledge thereof. The source node U1 identifies the data packets that are to be transmitted via the alternate network with an assured quality with the bit pattern obtained from the access node.

As an alternative thereto, such a bit pattern can be known to the source node U1 according to a corresponding implementation without having to be previously informed thereof by the access node. Such a bit pattern is normally located in the header of such a data packet. In conjunction with the Internet, the bit pattern can be found in what is referred to as the TOS byte.

Before the source node U1 sends the data packets, for whose transmission a requested quality is to be assured and which are therefore to be routed via an alternate network, in the direction of the access node, it is possible that the source node communicates a message with respect to the data packets to be routed via the alternate network to its destination node via the ordinary packet-switching network PN and potentially waits for an acknowledge from the destination node.

In the access node, the data packets arriving from the source node U1 are checked for the bit pattern with a filter (not shown in the FIG. 1). The data packets wherein the bit pattern was recognized are re-routed onto the alternate network. Alternatively, the function of the filter can be integrated into the routing table as being present in the access node, in that the bit patterns that produce a re-routing of a data packet identified with the bit pattern onto the alternate network, are additionally entered into the routing table.

Parallel to the above-described scenario with respect to the source node U1, the same scenario can be initiated by one or more other source nodes, for example U2.

Regardless of the requested quality, the source node U2 possibly employs the same bit pattern for identifying the data packets that are to be sent via an alternate network, for example ANn. Alternatively thereto, the source node U2 can use a bit pattern that corresponds to the requested quality for identifying the data packets to be routed via the alternate network.

In this way, the data packets sent in the direction of the access node from, a plurality of source nodes can be combined into classes according to the quality required for their transmission.

When the data packets to be re-routed in the access node are re-routed onto a plurality of alternate networks, one bit pattern is defined for each alternate network. In this way, the data packets can be re-routed onto an alternate network corresponding to the bit pattern that assures the requested quality.

When only one alternate network is available for re-routing the data packets identified with a bit pattern, the quality to be assured by the alternate network is offered by the bit pattern of the identified data packets.

The access node can deny re-routing onto the alternate network for data packets that are identified with a bit pattern that does not correspond to the quality offered by the alternate network.

Mutually independent actions of the above-described scenarios can also run in an arbitrary sequence.

The method of the present invention causes data packets of a packet switching network for whose transmission between their source node and their destination a specific quality is requested onto at least one alternate network. This re-routing is made possible in that the data packets to be routed via the alternate network are identified in their source node by a bit pattern known to the access node connected to the source node either directly or indirectly via at least one intermediate node. Upon arrival of the data packets in such an access node, the known bit patterns are recognized only as a result of themselves. Thus, the data packets identified with the known bit patterns are re-routed onto an alternate network.

A critical advantage of the method of the present invention is that the table present in an access node connected to a source node for determining the traffic paths, also known as the routing table, remains unaffected by ongoing modifications for the re-routing of the data packets for whose transmission a specific quality has been requested.

Also, when data packets need only be examined for the known bit pattern in the access node connected to a source node.

The method of the present invention is not negatively affected by the traffic flow of the ordinary packet-switching network is not negatively affected by the re-routing of the data packets. By selecting a known bit pattern, a desired transmission quality can be assured.

Data packets arriving in an access node directly or indirectly connected to a source node proceeding from the source node are checked with a filter for a bit pattern known to the access node. When a known bit pattern has been recognized, the re-routing of the data packets identified with such a bit pattern onto an alternate network is initiated.

The method of the present invention is particularly beneficial particularly because all data packets arriving at the access node need not be examined for the known bit pattern, but only a significantly lower plurality of data packets, namely those coming from a source node. In addition, data packets that are sent from the destination node back to the source node, for example for the purpose of an acknowledgment, are re-routed onto the alternate network. Thus, the data packets are unintentionally sent in a circle.

The function of the filter is integrated in a table for determining the traffic paths, also know as the routing table, that is present in such an access node. This occurs with an additional entry of the known bit pattern, thereby producing a re-routing of a data packet identified with such a bit pattern onto an alternate network. Implementation of the filter is simplified because the memory structures already present can be utilized to integrate the function of the filter into the routing table.

The known bit pattern is located in the header part of a data packet to be routed via an alternate network. As a result thereof, data packets can be designationally and examined for the known bit pattern.

The method of the present invention uses the same bit pattern for identifying data packets to be routed via an alternate network regardless of the requested quality. Thus, examination of such data packets for a known bit pattern is considerably simplified. Further, data packets for whose transmission a different transmission quality is requested are combined into a class, so that the alternate network need offer only one of the requested qualities for the transmission of these data packets.

As an alternative, the source nodes can also employ different bit patterns for identifying such data packets. These different bit patterns correspond to the respectively requested quality. This has the advantage that such data packets can be divided into classes according to their requested quality. The alternate network can thus offer the quality corresponding to a class for the transmission of the data packets.

Another embodiment of the method of the present invention provides that each recognized bit pattern of a data packet produces a re-routing thereof onto an alternate network with a requested quality that corresponds to the bit pattern. In other words, data packets of a class are re-routed onto one of the possible alternate networks that corresponds to the bit pattern of the class and offers the quality requested by the class.

In another embodiment of the present invention, each recognized bit pattern of a data packet can produce a re-routing thereof onto a single alternate network that assures the quality that corresponds to the bit pattern and, thus, to the class of the data packets.

The above-presented developments for dividing the data packets into classes corresponding to the requested quality offers the advantage that an alternate network need not explicitly offer the respectively requested quality for each transmission of data packets to be undertaken.

After recognition of such a bit pattern of a data packet to be routed via an alternate network in such an access node, the re-routing of the data packet onto an alternate network can be prevented when the alternate network cannot offer the quality corresponding to the bit pattern. In this way, such an access node can defend such an alternate network against data packets that lead to an overload.

In addition, the source node that intends to send data packets, communicates a message to its destination node via the packet-switching network with respect to the data packets to be routed via an alternate network and potentially waits for an acknowledge from the destination node. A secured connection setup of a point-to-point connection between the source and the destination node is achieved as a result thereof.

Further, the access node directly or indirectly connected to such a source node sends a message with respect to the quality to be assured as requested by the source node to the network node of an alternate network and potentially waits for an acknowledge therefrom. This procedure serves the purpose of dependably offering of the requested quality by the network node of the alternate network.

The method of the present invention can be applied to a network constellation wherein such an alternate network is formed, wherein that at least one logical channel of the packet-switching network is reserved for the data packets to be transmitted with an assured quality. For instance, an alternate network is composed of one or more logical channels of the packet-switching network. This represents an especially cost-beneficial solution since the need for additional connecting lines for the alternate network is eliminated.

Although modifications and changes may be suggested by those skilled in the to which this invention pertains, it is the intention of the inventor to embody with the patent warranted hereon all changes and modifications that may reasonably and property come under the scope of their contribution to the art.

The invention claimed is:

1. A method for re-routing data packets of a packet-switching network onto at least one alternate network that assures a quality requested by a network user, the packet-switching network and the at least one alternate network form sub-networks of a network over which data packets can be transmitted, including at least one source node and at least one destination node that are each respectively one of either directly or indirectly connected to an access node via at least one intermediate node, the access node setting up a connection both to the packet-switching network and to one of the at least one alternate network, the method comprising:

identifying by a respective bit pattern known to the access node the data packets to be routed via an alternate network in the source node by a bit pattern known to the access node;

recognizing the known bit pattern upon arrival of such data packets in the access node;

re-routing the data packets identified with the known bit pattern onto an alternate network;

connecting to the source node a filter that is integrated in a table for determining traffic paths in the access node via an additional entry of the bit pattern that can produce a rerouting of a data packet identified with the bit pattern onto an alternative network;

using in at least one source node, bit patterns corresponding to the respectively requested quality;

using each recognized bit pattern of a data packet to produce a re-routing thereof onto at least one alternate network with a quality corresponding to the recognized bit pattern; and preventing the re-routing of the data packet onto at least one alternate network, if after recognition of the bit pattern of a data packet to be routed via the at least one alternate network in the access node, the at least one alternate network cannot offer the quality corresponding to the bit pattern.

2. The method according to claim 1, further comprising the step of using the filter in the access node to check data packets arriving from the source node for the known bit pattern; and initiating the re-routing of the data packets identified with this bit pattern onto an alternate network when the known bit pattern is recognized.

3. The method according to claim 1, further comprising the step of connecting to the source node one of either directly or indirectly via at least one intermediate node containing the table for determining traffic paths into which the function of the filter is integrated, the table additionally contains bit patterns that can produce a re-routing of the data packet identified with the bit patterns onto an alternate network.

4. The method according to claim 1, further comprising the step of using the same bit pattern in at least one source node regardless of the respectively requested quality.

5. The method according to claim 1, further comprising the step of using bit pattern of a data packet to produce a re-routing thereof onto at least one alternate network, corresponding to the bit pattern with a specific quality.

6. A method for re-routing data packets of a packet-switching network onto at least one alternate network that assures a quality requested by a network user, the packet-switching network and the at least one alternate network form sub-networks of a network over which data packets can be transmitted, including at least one source node and at least on destination node that are each respectively one of either directly or indirectly connected to an access node via at least one intermediate node, the access node setting up a connection both to the packet-switching network and to one of the at least one alternate network, the method comprising:

identifying only by a respective bit pattern known to the access node the data packets to be routed via an alternate network in the source node by a bit pattern known to the access node that is connected to the source node either directly or indirectly via at least one intermediate node;

recognizing the known bit pattern upon arrival of such data packets in the access node;

re-routing the data packets identified with the known bit pattern onto an alternate network;

connecting to the source node a filter that is integrated in a table for determining the traffic paths in the access node via an additional entry of the bit pattern that can produce a rerouting of a data packet identified with the bit pattern onto an alternative network;

locating the known bit pattern in the header of a data packet to be routed via the alternate network;

using in at least one source node, bit patterns corresponding to the respectively requested quality;

using each recognized bit pattern of a data packet to produce a re-routing thereof onto at least one alternate network with a quality corresponding to the recognized bit pattern; and preventing the re-routing of the data packet onto at least one alternate network, if after recognition of the bit pattern of a data packet to be routed via the at least one alternate network in the access node, the at least one alternate network cannot offer the quality corresponding to the bit pattern.

7. The method according to claim 6, further comprising the steps of having the at least one source node send the data packets to communicate a message via the packet-switching network to at least one destination node with respect to the data packets to be routed via the at least one alternate network;

and waiting for an acknowledgment from the at least one destination node.

8. The method according to claim 7, further comprising the step of having the access node connected to the at least one source node send a message with respect to the assured quality requested by the at least one source node to the network the at least one alternate network; and waiting for an acknowledgement thereof.

9. The method according to claim 8, further comprising the step of reserving for data packets to be transmitted with an assured quality, at least one logical channel of the packet switching network, in a network constellation in which the at least one alternate network is formed.

10. The method according to claim 1, further comprising the steps of having the at least one source node send the data packets to communicate a message via the packet-switching network to at least one destination node with respect to the data packets to be routed via the at least one alternate network, and waiting for an acknowledgement from the at least one destination node.

11. The method according to claim 10, further comprising the step of having the access node connected to the at least one source node send a message with respect to the assured quality requested by the at least one source node to the network the at least one alternate network, and waiting for an acknowledgement thereof.

12. The method according to claim 11, further comprising the step of reserving for data packets to be transmitted with an assured quality, at least one logical channel of the packet switching network, in a network constellation in which the at least one alternate network is formed.

* * * * *